United States Patent
Annamalai et al.

(10) Patent No.: US 10,178,168 B2
(45) Date of Patent: Jan. 8, 2019

(54) READ-AFTER-WRITE CONSISTENCY IN DATA REPLICATION

(71) Applicant: Facebook, Inc., Menlo Park, CA (US)

(72) Inventors: Muthukaruppan Annamalai, Redmond, WA (US); Zelaine Fong, San Carlos, CA (US); Marc Alexander Celani, Sunnyvale, CA (US); Vishal Kathuria, Palo Alto, CA (US); Sanketh Indarapu, Santa Clara, CA (US); Rohit Subhash Bhoj, Milpitas, CA (US); Benjamin Francois Marie Renard, San Francisco, CA (US); Sumeet Ungratwar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 280 days.

(21) Appl. No.: 14/830,443

(22) Filed: Aug. 19, 2015

(65) Prior Publication Data

US 2017/0054802 A1 Feb. 23, 2017

(51) Int. Cl.
*G06F 15/167* (2006.01)
*H04L 29/08* (2006.01)
*H04L 29/06* (2006.01)
*H04L 29/14* (2006.01)
*G06F 17/30* (2006.01)

(52) U.S. Cl.
CPC .... *H04L 67/1095* (2013.01); *G06F 17/30575* (2013.01); *H04L 67/1097* (2013.01); *H04L 67/42* (2013.01); *H04L 69/40* (2013.01)

(58) Field of Classification Search
CPC ............. H04L 67/1097; H04L 67/1095; G06F 17/30377
USPC ........................................................ 709/213
See application file for complete search history.

(56) References Cited

U.S. PATENT DOCUMENTS

| | | | | |
|---|---|---|---|---|
| 5,819,272 | A * | 10/1998 | Benson | G06F 17/30581 |
| 2005/0108231 | A1 * | 5/2005 | Findleton | G06F 3/061 |
| 2005/0108324 | A1 * | 5/2005 | Stritzinger | G06Q 10/087 709/203 |
| 2005/0138540 | A1 * | 6/2005 | Baltus | G06F 17/2211 715/229 |
| 2006/0136511 | A1 * | 6/2006 | Ngo | G06F 17/2288 |
| 2006/0253504 | A1 * | 11/2006 | Lee | G06F 17/30578 |

(Continued)

*Primary Examiner* — Vivek Srivastava
*Assistant Examiner* — Atta Khan
(74) *Attorney, Agent, or Firm* — FisherBroyles, LLP

(57) ABSTRACT

The disclosure is directed to data replication in a distributed computing system. The system ensures a read-after-write consistency for the replicated data by associating the write requests with unique version numbers, and using them to obtain the data. A server associates a write request with a unique version number, and returns the version number to a client, which can use it in a subsequent read request for the data. On receiving a read request for a first data, the server extracts the version number from the request and ensures a specified write request associated with the version number is processed prior to obtaining the data. If the specified write request is processed, the server obtains the data and returns it to the client, else the server processes the pending write requests up until the version number and then the specified write request, and returns the specified data to the client.

20 Claims, 8 Drawing Sheets

(56) References Cited

U.S. PATENT DOCUMENTS

| | | | |
|---|---|---|---|
| 2007/0168215 A1* | 7/2007 | Tang | G06Q 10/109 |
| | | | 379/88.04 |
| 2007/0260648 A1* | 11/2007 | Friesenhahn | G06F 17/30011 |
| 2008/0250474 A1* | 10/2008 | Bhogal | G06F 17/24 |
| | | | 726/1 |
| 2008/0294701 A1* | 11/2008 | Saraswati | G06F 17/30578 |
| 2010/0114824 A1* | 5/2010 | Krishnaprasad | G06F 11/2094 |
| | | | 707/637 |
| 2013/0041971 A1* | 2/2013 | Bhogal | G06F 11/2094 |
| | | | 709/213 |
| 2013/0110781 A1* | 5/2013 | Golab | G06F 17/30581 |
| | | | 707/638 |

* cited by examiner

*(Continuted)*

US 10,178,168 B2

READ-AFTER-WRITE CONSISTENCY IN DATA REPLICATION

BACKGROUND

Current data replication methods replicate data from a read-write primary data storage server to read-only secondary data storage servers. Data storage servers are referred to herein as simply servers. The primary server and the secondary servers can be located in different geographical regions. One of the characteristics of such a replication technique can include a slow write operation if a client computer ("client") that is writing data to the primary server is located in a geographical region different from that of the primary server. Moreover, if the write operation is a synchronous write operation, the client can experience an additional delay, which is incurred in writing the data to the secondary servers. Typically, the client is unaware of why the write operations are slow, which can lead the clients to conclude that the application writing the data is faulty or slow. Increasing the number of secondary servers can increase data availability and/or reliability as a number of replicas of the data increases. However, increasing the number of servers can further increase the delay. Accordingly, the above data replication method is not scalable.

As can be the case with synchronous replication, the client resources can be held up until the client receives an acknowledgement indicating the successful write, thereby increasing a latency of the write operation ("client-perceived write latency"). In some embodiments, the client-perceived write latency is defined as amount of time taken to complete a write operation, which can include the time elapsed between a primary server receiving a write request from a client and the client receiving an acknowledgement that the data is stored at the distributed computing system with a specified reliability. Some replication methods attempt to decrease the client-perceived write latency by acknowledging the client even before the data is stored at the storage systems. However, such a replication method can cause data inconsistency. For example, if a client issues a read request immediately after it asked the primary server to store the data, if that data has not been stored at the storage system yet, the data may not exist in the storage system yet, or if it exists, can be stale. Accordingly, the current replication methods do not provide data consistency.

DETAILED DESCRIPTION

Figure 1:
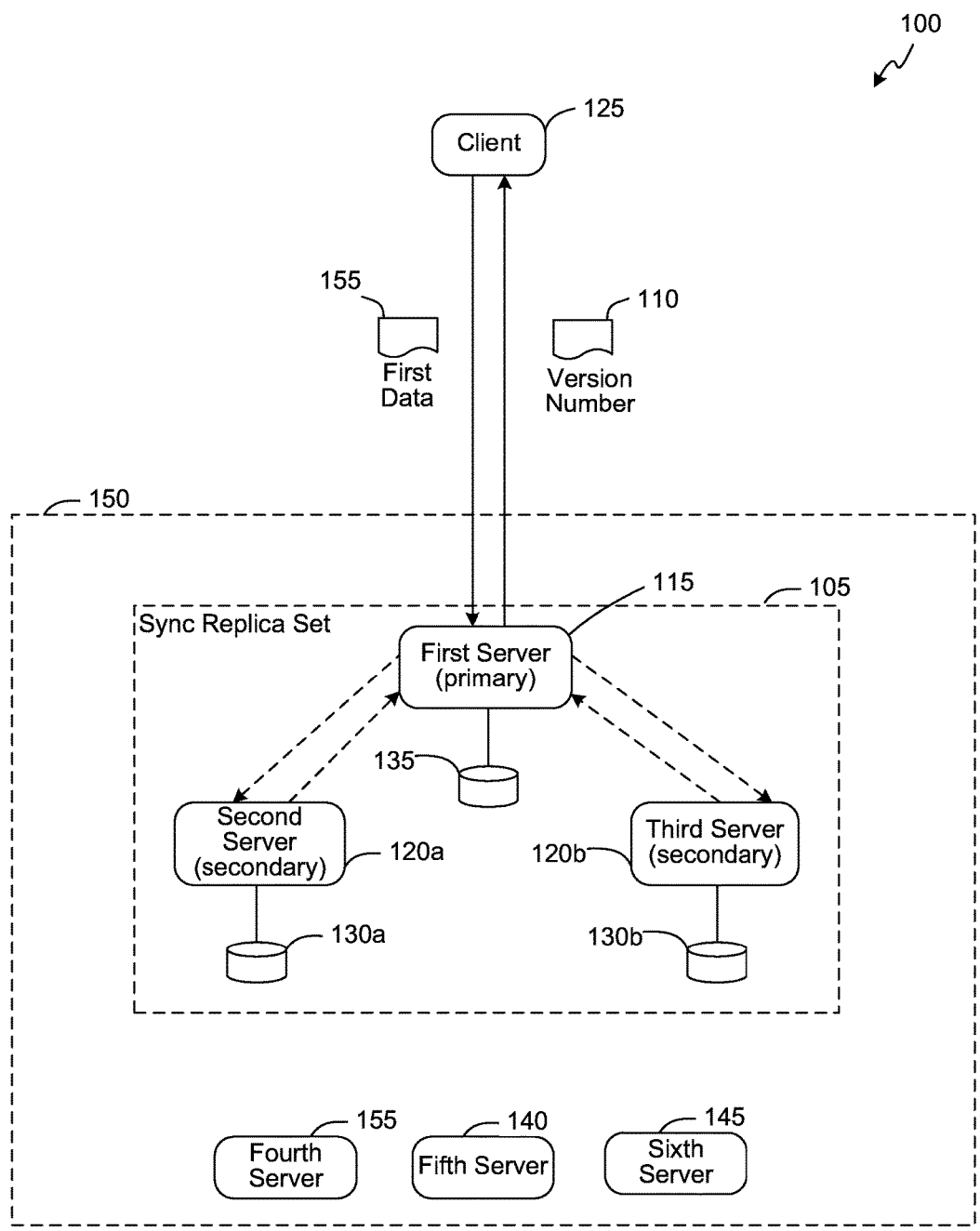
FIG. 1 a block diagram illustrating an environment in which the embodiments can be implemented.

Embodiments are disclosed for replicating data in a distributed computing system. The embodiments provide efficient data replication, e.g., a quick and fast replication with a specified data durability and reliability, while also maintaining data consistency. The data can be replicated to many server computers ("servers") in the distributed computing system. A server in the distributed computing system can have one or more roles. For example, a server can be a primary server and/or a secondary server. A primary server can process both read and write data requests from a client computer ("client"). A secondary server may process a read request from the client but not a write request. The secondary server receives data from the primary server, e.g., as part of data replication, and stores the received data in a data storage system ("storage system") associated with the secondary server.

The embodiments employ an optimized replication protocol, which helps in minimizing a client-perceived write latency. In some embodiments, the optimized replication protocol is based on Paxos protocol. The optimized replication protocol eliminates one or more phases, e.g., a "prepare" phase from known replication protocols. The "prepare" phase, which is used to order a set of writes received from different servers, can be eliminated as the primary server is the only server that can service write requests from a client. When the client issues a write request to write a specified data, a primary server receives the specified data and initiates a replication operation to replicate the specified data to the one or more secondary servers, e.g., synchronously. In the "accept" phase, when the primary server receives an indication from a quorum of the secondary servers indicating that the quorum of the secondary servers is prepared to store the specified data to their corresponding storage systems, the primary server sends an acknowledgement to the client indicating a successful write of the specified data in the distributed computing system.

After the "accept" phase, the replication protocol can proceed to the "commit" phase where the primary server can instruct the secondary servers to commit the specified data to their corresponding storage systems, and store the specified data in a storage system associated with the primary server. By acknowledging the client before the "commit" phase, e.g., after the "accept" phase, the optimized replication protocol minimizes the time the client may have to wait to receive an acknowledgement.

Although acknowledging the client prior to the "commit" phase can minimize the client-perceived write latency, the above method can result in data inconsistency as the specified data may not be written to the storage system of the primary server (and/or the secondary servers) until the "commit" phase is executed, e.g., the write request may still be in a queue of pending write requests of the primary server (and/or the secondary servers). When the client issues a read request immediately after the write request ("read-after-write") for the specified data, the data retrieved from the storage system can be stale, e.g., the retrieved data can be different from the specified data provided in the write request. In order to avoid this data inconsistency, the primary server associates the write request with a version number and uses this version number to ensure that the data returned to the client is the latest. For example, the primary server generates a version number upon receiving a write request for the specified data, and returns the version number to the client. The client can include this version number in a subsequent read request for the specified data. Upon receiving the read request from the client, the primary server determines whether a write request associated with the provided version number is processed, e.g., data associated with the write request is stored. If the write request is already processed, the primary server retrieves the specified data from the storage system and returns it to the client. On the other hand, if the write request is not yet processed, e.g., there are other write requests that are received before the current write request pending in the queue, the primary server commits those pending write requests to the storage system, then commits the current write request and then retrieves the specified data from the storage system, and returns the specified data to the client. By using the version number for accessing data as described above, the embodiments can eliminate any potential data inconsistency.

In some embodiments, the primary server can generate the version number in a sequence, e.g., as a monotonically increasing number which is incremented for every write request received from a specified client. In some embodiments, the sequence can be unique to a specified client. For example, the write requests received from a first client can be associated with a first sequence of version numbers and the write requests received from a second client can be associated with a second sequence of version numbers. The primary server can associate a unique version number for every write request received from a specified client.

In some embodiments, the primary server sends the version number associated with the request to the secondary servers to which the data is replicated. Accordingly, the secondary servers can also use this version number to service any read requests received from the clients. In some embodiments, the secondary servers process the read requests from the clients in a way similar to the primary server as described above, e.g., to avoid data inconsistencies.

The embodiments can support both synchronous and asynchronous replication. In some embodiments, the data is replicated to the secondary servers synchronously and asynchronously to another set of servers. Some or all of the servers can be physically located at different locations. For example, the primary server can be in a first location, one secondary server can be in a second location and another secondary server can be in a third location. A location can be one or more of a country, a region of a country, a state, a city, a datacenter, a cluster in a datacenter, a rack in a cluster, or any other user defined location.

The distributed computing system can store data as shards. For example, a distributed computing system such as a social networking application can store data such as user profile data, pictures, messages, comments, etc., associated with users of the social networking application. The data can be partitioned into multiple logical partitions, each of which can be referred to as a shard. Each of the shards can contain a portion of the data, e.g., data of a subset of the users, a subset of the pictures, etc. In some embodiments, the servers can assume different roles for different shards. For example, a first server can be a primary server for a first shard, a secondary server for a second shard.

In some embodiments, the distributed computing system includes a shard management server computer ("shard management server") that defines a sync replica set for a specified shard, which identifies the primary and/or secondary servers for the specified shard and their placements across various locations. The shard management server can define a sync replica set for a specified shard based on various factors, e.g., number of replicas required, level of data reliability and availability desired, placement of the servers across regions, a failover policy, a load balancing policy, and a maximum write latency. For example, if a minimum of three replicas are required for a specified shard, the sync replica set can include one primary server and two secondary servers each of which stores a replica of the specified shard. The primary server processes any read and/or write requests for data associated with the specified shard. The secondary servers store replicas of the specified shard and can, optionally, service read requests from the clients for data associated with the specified shard. However, the secondary servers may not process any write requests for the specified shard.

The shard management server can assign different shards to different servers based on one or more of the factors described above. For example, a first server can be a primary server for a first shard and a secondary server for a second shard. After the shard management server defines the shard assignments, the shard assignments can be published to a directory service, which can be used by the client for identifying the primary server assigned to a specified shard. Further, the shard assignments and/or sync replica sets can be defined based on an application level, that is, the shard assignments can be different for different applications in the distributed computing system.

The embodiments provide efficient data replication, e.g., achieve high data reliability and durability, and minimize client-perceived latency for replication without causing any data inconsistencies.

Turning now to the figures, FIG. 1 is a block diagram illustrating an environment in which the embodiments can be implemented, consistent with various embodiments. The environment 100 includes a distributed computing system 150 having multiple servers. Data, e.g., received from a client 125, is replicated to a number of servers in the distributed computing system 150. The data can be replicated synchronously to some servers and asynchronously to some other servers. For example, data can be replicated synchronously to one or more servers in a synchronous replica set ("sync replica set") 105, and asynchronously to one or more servers, e.g., servers 140-155.

A sync replica set can include a server that is functioning as a primary server and a configurable number of servers that are acting as secondary servers. For example, the sync replica set 105 includes a first server 115 that is functioning as a primary server and a second server 120a and a third server 120b functioning as secondary servers. In some embodiments, a sync replica set guarantees consistency among a specified number of replicas for data, e.g., even in the case of failure of any of the servers in the sync replica set. In the environment 100, the sync replica set 105 is an example of a "3-way" replication, in which the distributed computing system 150 can guarantee three replicas of the data. Typically, in a "3-way" replication, a sync replica set includes one primary server and two secondary servers. The number of servers in a sync replica set is configurable and can depend on various factors, e.g., fault tolerance, load balancing, write latency and other required performance characteristics. In some embodiments, more the number of servers in the sync replica set 105, the higher the time taken to service a write request from the client 125 as data is replicated to the servers synchronously.

The servers in the sync replica set 105 can be physically located at same or difference locations. For example, the servers in the sync replica set 105 can reside in the same rack of a cluster of a datacenter, the same cluster, the same data center, the same region, or even cross regions. The placement of the servers can depend on various factors, e.g., fault tolerance and other performance requirements.

When the client 125 issues a write request for writing data, e.g., a first data 155, to the distributed computing system 150, a primary server in the sync replica set 105, e.g., the first server 115, receives the write request. The primary server 115 replicates the first data 155 to the secondary servers 120, e.g., synchronously. The replication process can be implemented over a number of phases. For example, the replication process can include an accept phase and a commit phase. In the accept phase, the primary server 115 can send a message to the secondary servers 120, e.g., in parallel, asking them if they are ready to store the first data 155 at their associated data storage systems. The secondary servers 120 can either agree or disagree to store the first data 155. In some embodiments, the secondary servers 120 agree to store the first data 155. After the primary server 115 gets a confirmation from the secondary servers 120 indicating that they are ready to store the first data 155, the primary server 115 acknowledges the client 125 for the write request, and the replication process can proceed to the commit phase where the primary server 115 sends instructions to the secondary servers 120 to commit the first data 155 to their corresponding storage systems 130. The primary server 115 can then store the first data 155 in its storage system 135.

When the client 125 receives the acknowledgement, the client 125 can be assured that the first data 155 is stored at the distributed computing system 150 with a specified reliability. In the environment 100, the distributed computing system 150 implements a "3-way" replication, which guarantees three replicas of the first data 155 to the client 125. By acknowledging the client 125 before the commit phase the above replication process optimizes the replication process, e.g., by minimizing the client-perceived write latency, which is the time the client may have to wait to receive an acknowledgement indicating a successful write of the first data 155. After the client 125 receives the acknowledgement, the client 125 is free to perform other processes, which it cannot while it is awaiting the acknowledgement.

However, acknowledging the client 125 prior to the "commit" phase can result in data inconsistency as the first data 155 may not be written to the storage system 135 (and/or the storage systems 130*a* and 130*b*) yet, and if the client 125 issues a read-after-write request for the first data 155, either the first data 155 may not exist in the storage system 135 or the data retrieved from the storage system can be stale, e.g., the data retrieved from the storage system can be an older version of the first data 155. In order to avoid this data inconsistency, the primary server 115 can use a version number with read and write requests for accessing data. When the client 125 issues a write request for writing the first data 155, the primary server 115 associates the write request with a version number, e.g., version number 110, and returns this version number to the client 125. In some embodiments, the version number 110 can be sent as part of the acknowledgement. The client 125 can store the version number 110 in association with the first data 155.

A client that intends to obtain read-after-write consistency can include the version number associated the requested data in a read request for the data. For example, if the client 125 intends to obtain read-after-write consistency for the first data 155, the client 125 can include the version number 110 in a read request for reading the first data 155. Upon receiving the read request from the client 125, the primary server 115 determines whether a write request associated with the version number 110 is processed yet, e.g., first data 155 associated with the write request is committed to the storage system 135. If the write request associated with the version number 110 is already processed, the primary server 115 retrieves the first data 155 from the storage system 135 and returns it to the client 125. On the other hand, if the write request associated with the version number is not yet processed, e.g., there are other write requests that are received before the current write request pending in the queue, the primary server 115 commits those pending write requests to the storage system 135 and then commits the write request associated with the version number 110. The primary server 115 retrieves the first data 155 from the storage system 135 after committing the write request associated with the version number 110, and returns the first data 155 to the client 125. Accordingly, by using the version number for accessing data as described above, the replication process can eliminate any potential data inconsistency.

Referring back to the acknowledgement sent to the client 125, the primary server 115 may not have to wait for all of the servers that are configured to store a copy of the first data 155 to confirm their preparedness to store the first data 155 for the primary server 115 to acknowledge the client 125. The primary server 115 can send the acknowledgement to the client 125 after a quorum of the servers, e.g., a majority of the servers that are configured to store a copy of the first data 155, confirm their preparedness to the primary server 115 to store the first data 155 at their corresponding storage systems 130.

The distributed computing system 150 can host one or more applications executing on one or more application servers (not illustrated). Different applications can have different replication policies. A replication policy can define and/or include various factors for replicating data in the distributed computing system 150, e.g., a number of servers in the sync replica set, a physical placement of the servers of the sync replica set at various locations. An application can define its replication policy based on the application's performance requirements, e.g., data reliability, data availability, fault tolerance, scalability, load balancing. For example, an application which needs very low latency in replicating data can have fewer servers in the sync replica set, e.g., have a small quorum size in the sync replica set and/or physically place the servers in the same region, datacenter, etc. In another example, if an application requires high availability and can withstand a specified latency, it can have a large number of servers in the sync replica set. In yet another example, if a three way, cross-region synchronous replication setup cannot meet the performance goals of an application, the replication policy can be changed to a three way synchronous replication in a single region.

Figure 2:
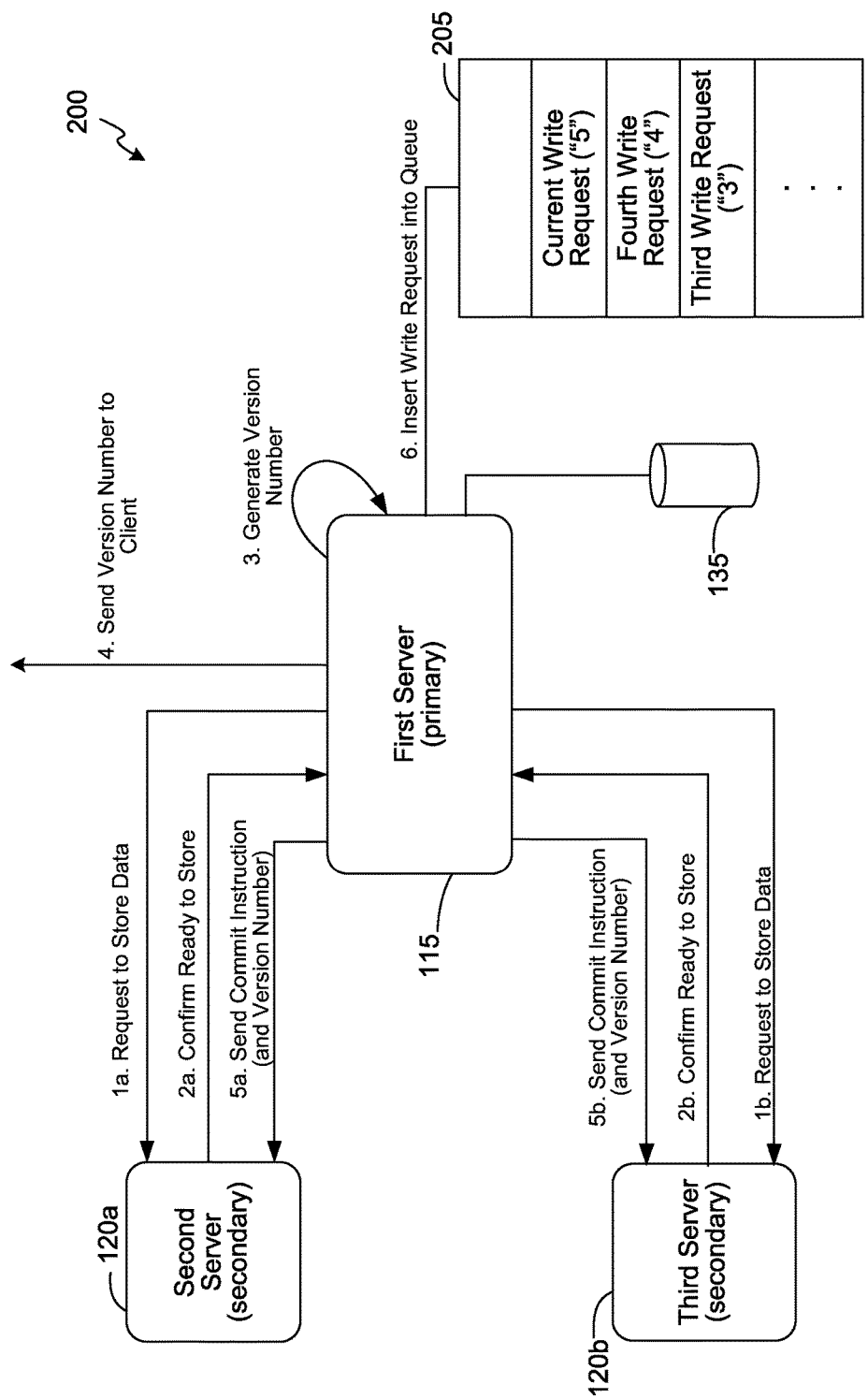
FIG. 2 is a block diagram of an example for performing data access operations using version numbers in a distributed computing system of FIG. 1, consistent with various embodiments.

FIG. 2 is a block diagram of an example 200 for performing data access operations using version numbers in a distributed computing system of FIG. 1, consistent with various embodiments. When a server, e.g., the primary server 115, receives a write request for writing data from a client, e.g., the first data 155 from the client 125, the primary server 115 replicates the data to the servers in a sync replica set associated with a shard the first data 155 belongs to over one or more phases of the replication process. In the accept phase of the replication process, the primary server 115 sends a request to the servers in the sync replica set for storing the first data 155. For example, the primary server 115 sends the request to a number of secondary servers including the secondary servers 120*a* and 120*b* as indicated in steps 1*a* and 1*b*. In some embodiments, the primary server 115 also sends the first data 155 to the secondary servers 120a and 120b as part of the request in steps 1a and 1b. Alternatively, the primary server 115 can send the first data 155 to the secondary servers 120a and 120b as part of the commit instruction in steps 5a and 5b though. The primary server 115 then waits for a quorum of the servers to confirm their preparedness to store the first data 155. In the example 200, the secondary servers 120a and 120b form the quorum of the servers. In some embodiments, a user, e.g., an administrator if the distributed computing system 150, can specify the quorum size. After the primary server 115 receives a confirmation from the secondary servers 120a and 120b indicating that they are ready to store the first data 155, the primary server 115 generates a version number, e.g., version number 110, for the write request, as indicated in step 3. The version number uniquely identifies a specified write request from a specified client.

In some embodiments, the primary server 115 can generate the version number in a sequence, e.g., as a monotonically increasing number which is incremented for every write request received from the specified client. In some embodiments, the sequence is unique to the specified client. For example, the write requests received from a first client can be associated with a first sequence of version numbers and the write requests received from a second client can be associated with a second sequence of version numbers.

The primary server 115 sends the version number 110 to the client 125 as indicated in step 4. The primary server 115 can send the version number along with the acknowledgement of the write request or separately. In some embodiments, the primary server 115 sends the version number along with the acknowledgement of the write request. The client 125 can store the version number 110 in association with the first data 155. This version number 110 can be used by the client 125, e.g., in a subsequent read request for obtaining the first data 155. By using this version number 110 in the read requests, the client 125 can be assured of the read-after-write consistency for the first data 155.

After the primary server 115 sends the acknowledgement to the client 125, the primary server 115 proceeds to the commit phase of the replication process. In the commit phase, as indicated in steps 5a and 5b, the primary server 115 issues a commit instruction to the secondary servers 120a and 120b and to each of the other servers in the sync replica set that are configured to store a copy of the first data 155, for storing the first data 155 in their corresponding storage systems.

The secondary servers 120a and 120b proceed to store the first data 155 in their corresponding storage systems accordingly. The primary server 115 inserts the write request into a queue of write requests, e.g., queue 205, as indicated in step 6. The queue 205 can include a number of write requests that are yet to be processed by the primary server 115. The write requests in the queue 205 can be ordered in the order they were received at the primary server 115. Further, the write requests in the queue 205 also include the version numbers they are associated with. Typically, a first write request has a lower version number than a second write request that is received later than the first write request, and a write request that has a lower version number is processed prior to a write request that has a higher version number. In the queue 205, a third write request has a version number "3," a fourth write request that is received after the third request has a version number "4," and the version number 110 of the current write request, which is received after the fourth write request, has a value "5." The primary server 115 processes the write requests based on the order they were received, e.g., in the increasing order of their version numbers. The data associated with a specified write request in the queue 205 is stored at the storage system 135 as and when the specified write request is processed by the primary server 115.

When the primary server 115 receives a read request for a specified data from the client 125, the primary server 115 extracts the version number, if any, from the read request and determines if the write request associated with the version number is already processed or still in the queue 205. If the write request associated with the extracted version number is already processed, the specified data is already stored at the storage system 135 and therefore, the primary server 115 obtains the specified data from the storage system 135 and returns the specified data to the client 125. On the other hand, if the write request associated with the extracted version number is still in the queue 205, the primary server 115 processes the pending write requests in the queue 205 up until the write request associated with the extracted version number, then processes the write request associated with the extracted version number, stores the specified data in the storage system 135, and then obtains the specified data from the storage system 135 and returns the specified data to the client 125. This way, the client 125 can be assured of the read-after-write consistency.

In some embodiments, the client 125 can perform a read request at one or more of the secondary servers 120a and 120b too. The secondary servers 120a and/or 120b can also use the version number as described above to ensure read-after-write consistency.

In some embodiments, a version number is generated only by a primary server and not secondary servers. However, the primary server 115 can send a version number, e.g., the version number 110, associated with a write request to the secondary servers 120a and 120b, when the primary server 115 generates the version number for a specified write request. For example, when the primary server 115 generates the version number 110 for the write request associated with the first data 155, the primary server 115 can send the version number 110 to the secondary servers 120a and 120b as well. The primary server 115 can send the version number as part of the commit instruction, e.g., in steps 5a and 5b.

The primary server 115 can have separate queues processing write requests from separate clients or can have one queue to store all write requests. Regardless, in some embodiments, the primary server 115 ensures that (a) the write requests are processed in the order they were received at the primary server 115 and (a) the version numbering sequence assigned to the write requests is unique to a client, that is, the sequence is not shared between multiple clients. The primary server 115 can employ any of a number of methods to ensure that a version number is unique to the client. For example, a version number generated for a specific client can be associated with an identification (ID) of the client.

Referring back to the example 200, note that the order of the steps can be different from what is illustrated. For example, the primary server 115 can insert the write request into the queue 205 prior to sending the commit instruction to the secondary servers 120a and 120b. Also some of the steps can be performed concurrently. For example, steps 1a and 1b can be performed concurrently.

Figure 3:
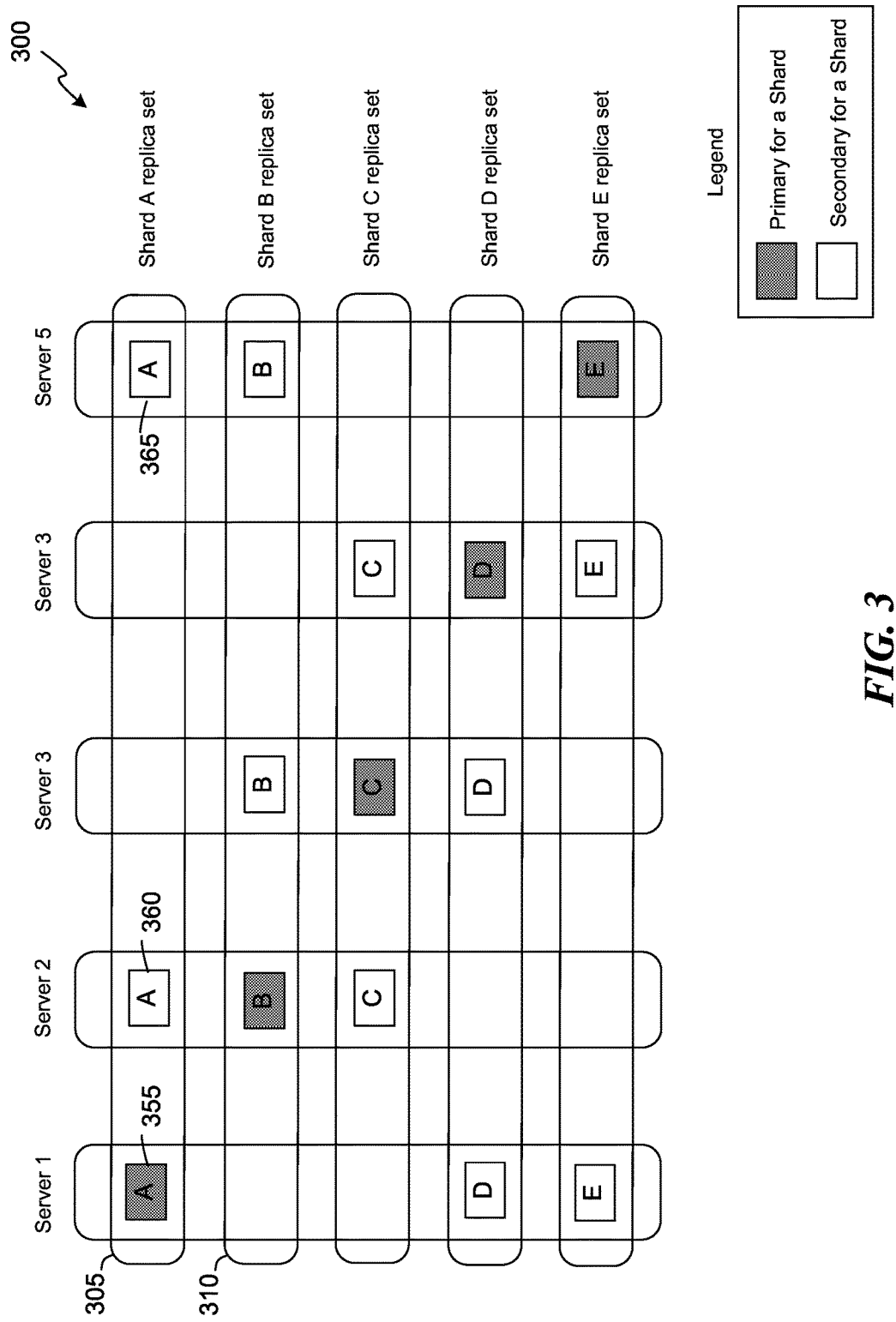
FIG. 3 is a block diagram of an example illustrating placement of shards in a distributed computing system of FIG. 1, consistent with various embodiments.

FIG. 3 is a block diagram of an example 300 illustrating placement of shards in a distributed computing system of FIG. 1, consistent with various embodiments. The servers in the example 300 can be similar to the servers in the environment 100 of FIG. 1. For example, "server 1" can be similar to the primary server 115, "server 2" can be similar to the secondary server 120a and "server 5" can be similar to secondary server 120b.

As described above, data in the distributed computing system 150 can be managed as shards, which are logical partitions of data. In some embodiments, the shards store disjoint subsets of the data in the distributed computing system 150. For example, a social networking application implemented in the distributed computing system 150 can generate data such as user profile data, pictures, messages, comments, etc., associated with users of the social networking application. The data can be partitioned into multiple shards. Each of the shards can contain a portion of the data, e.g., data of a subset of the users, a subset of the pictures, etc. In some embodiments, a server can host more than one shard. In the example 300, a server hosts three shards.

In some embodiments, different shards are assigned to different servers. As illustrated in the example 300, shard "A" is assigned to "server 1," shard "B" is assigned to "server 2," shard "C" is assigned to "server 3" and so on. In some embodiments, a shard management server (which is described at least with reference to FIG. 4 below) in the distributed computing system 150 decides the shard placements among the servers.

Further, in some embodiments, the servers can assume different roles for different shards. The shard management server can assign the roles for the servers. As illustrated in the example 300, "server 1" can be a primary server for a shard "A" and a secondary server for shards "D" and "E." What this can mean is that a sync replica set can be different for different shards. For example, in a first sync replica set 305 for a shard "A," "server 1" is a primary server and the servers "server 2" and "server 5" as secondary servers, and in a second sync replica set 310 for shard "B," "server 2" can be a primary server and the servers "server 3" and "server 5" can be secondary servers. In FIG. 3, a shaded block in a server, e.g., shard "A" 355, indicates that a server which hosts a shard represented by the shaded block is a primary server for that shard. Similarly, an unshaded block in a server, e.g., shard "A" 360 and shard "A" 365, indicates that a server which hosts a shard represented by the block is a secondary server for that shard.

The shard management server can make these assignment decisions based on various factors, e.g., a number of shards a server can host, a placement policy (number of replicas, placement across region/datacenter/cluster/rack, etc.), a failover policy, a load balancing policy, and other performance requirements. The shard assignments can be published, e.g., for use by the client 125. In some embodiments, the shard assignments of the primary and secondary servers are published but not that of the follower servers. That is, for a given shard, the client 125 can retrieve information regarding the primary and secondary servers but not that of the follower servers.

Figure 4:
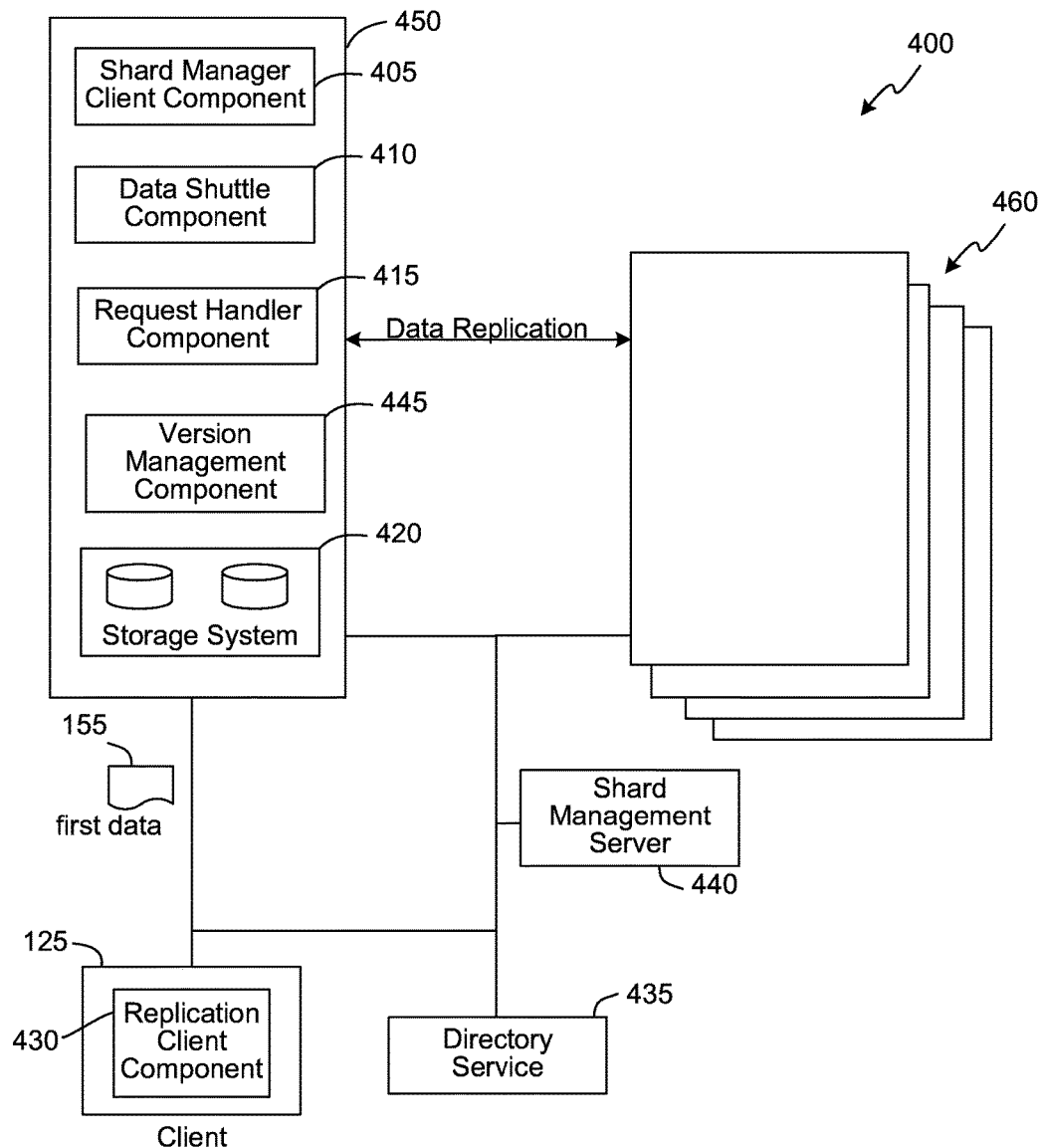
FIG. 4 is a block diagram of a system for implementing the embodiments in the distributed computing system of FIG. 1, consistent with various embodiments.

FIG. 4 is a block diagram of a system 400 for implementing the embodiments of FIG. 1, consistent with various embodiments. In some embodiments, the system 400 can be implemented in the environment 100 of FIG. 1. The system 400 includes a number of servers, e.g., a first server 450 and a set of servers 460. Each of those servers can be a primary server, a secondary server and/or a follower server. As described above at least with reference to FIG. 3, the above servers can assume different roles for different shards. In some embodiments, the first server 450 can be similar to the primary server 115 of FIG. 1 and the set of servers 460 can include one or more secondary servers similar to the secondary server 120a and 120b.

The system 400 includes a shard management server 440 that performs various shard related tasks, including assigning shards to servers, defining a sync replica set for a shard. The shard management server 440 can assign shards to servers based on various factors, e.g., a number of shards a server can host, a placement policy (number of replicas, placement across region/datacenter/cluster/rack, etc.), a failover policy, a load balancing policy, and other performance requirements of an application, all of which can be defined in a replication policy of the application. The shard management server 440 can consume the replication policy and place/assign different shards across the servers as per the requirements. As new databases are created and/or deleted and the shard associated with a database changes, the replication policy can be updated. The shard management server 440 can provide an efficient failover mechanism, e.g., by re-assigning roles and moving replicas around in the face of failures of one or more servers in the system 400.

The shard management server 440 can make the assignments for a sync replica set. The shard management server 440 publishes the shard assignments, e.g., to a directory service 435. A client, e.g., client 125, can query the directory service 435 to obtain the shard assignments, e.g., a primary server and/or secondary servers assigned for a specified shard. For example, the client 125 can query the directory service 435 to obtain a primary server, e.g., the first server 450, that is assigned to a shard to which the first data 155 belongs.

In some embodiments, a write request from the client 125 is only serviced by a primary server and a read request can be serviced by either the primary server or one of the secondary servers. For example, a write request from the client 125 for writing the first data 155 is processed by the primary server, e.g., the first server 450. The secondary servers do not process any write requests from the client 125. However, they can process read requests from the client 125.

The first server 450 includes a version management component 445 to generate a version number for an incoming write request from a client, e.g., version number 110. The version management component 445 associates the version number with the request.

While the clients can directly communicate with the servers, there is a reasonable amount of work involved, e.g., in finding the right server that is the primary server for a given shard and passing in right headers such as a version number in the header of a read request to ensure read-after-write consistency. In some embodiments, the client 125 includes a replication client component 430, which performs various tasks, e.g., find the primary server for a given shard. The replication client component 430 also maintains the version numbers returned from the primary server on write requests, e.g., for a particular data object, and passes the latest version of the data object it last received along with read requests in order to ensure read-after write consistency, e.g., to ensure the data object retrieved is the latest and not of a version before the last write.

A server, e.g., the first server 450, can replicate the data to other servers, e.g., a secondary server in the set of servers 460, using a data shuttle component 410. Before the first server 450 can start queuing replication operations, the data shuttle component 410 may need to know the configuration information surrounding all relevant shards. The data shuttle component 410 can use this configuration information to build the replication network. The configuration information that the data shuttle component 410 may require can include the list of shards the first server 450 is responsible for, the role that the first server 450 plays for each of those shards, the other servers that host each of those shards, and the roles that each of those servers play for those shards. The configuration information can continue to change at runtime as shards can be moved around and roles are changed, e.g., because of failover or load balancing. The data shuttle component 410 can automatically make any such transitions. In some embodiments, the data shuttle component 410 can derive the configuration information from the shard management server 440.

The data shuttle component 410 allows for the replication of opaque blobs and/or stream of updates and does not make any assumptions about the replicated payload. The data is stored at a storage system associated with a server. For example, the first server 450 stores the first data 155 in the storage system 420. In some embodiments, the storage system 420 is similar to the storage system 135. In some embodiments, the storage system 420 is a database that can store key-value pairs. The data that is stored or replicated to a server can be a serialized form of the data. A request handler component 415 can convert write requests to this serialized form before the data is passed to the data shuttle component 410 for generating quorum and ensuring the necessary replication factor. The write request can be rejected by the data shuttle component 410 if the first server 450 is not a primary server for the shard with which the first data 155 is associated.

In some embodiments, the first server 450 acknowledges the write request from the client 125 at two different points, once when it has been successfully acknowledged by the quorum in the sync replica set (e.g., formed using one or more secondary servers from the set of servers 460) and once when the update is applied to the local storage, e.g., the storage system 420 of the first server 450. Depending on the configuration, the request handler component 415 can acknowledge the client 125 at either point. In some embodiments, waiting for the update to be committed to the storage system 420 before returning to the client 125 would mean higher client response latencies. In some embodiments, acknowledging the client 125 immediately after the update was successfully acknowledged by the quorum but before it has been persisted to the local storage would mean faster response latencies but it can also mean that an immediate read of the same data might return a stale response since the update might not have been committed by the time the read arrives (e.g., no read-after-write consistency). In order to deal with this, the request handler component 415 gets the version number associated with the write request from the data shuttle component 410, which obtains the version number from the version management component 445, and sends it to the client 125 in the form of a response header. If read-after-write consistency is required, the client 125 can pass this version number in as a request header when performing reads, in order to ensure that any returned data is not stale with respect to this version.

In some embodiments, all read requests to the first server 450 bypasses the data shuttle component 410 since the read requests do not involve any data set mutations. These read requests can be served directly from the local storage, e.g., storage system 420. Note that reads can be served from secondary servers as well, however in order to ensure that returned data is not stale, clients may need to specify the previously mentioned version when performing the read.

Referring back to the first server 450 or the set of servers 460, a server includes a shard manager client component 405 that works with the shard management server 440 to implement the shard assignments determined by the shard management server 440. The shard manager client component 405 upon startup of the first server 450, apart from establishing a heartbeat to announce its liveness, can let the shard management server 440 know which service and a specific deployment the first server 450 is associated with. The shard management server 440 conveys any shard placement decisions to the shard manager client component 405.

A new shard can be added to a server when it is a new shard, the shard is being failed over from another server, or the shard is being load balanced into the local server. The addition of a new shard in a specific role can cause the shard manager client component 405 to feed in the new configuration information to the data shuttle component 410.

An existing shard on a server is dropped when the shard is deleted or the shard is being load balanced out of the server. The drop of a shard can cause the shard manager client component 405 to notify the data shuttle component 410 of the change.

It is also possible that the role for a specific shard that the local server, e.g., first server 450, plays has changed (primary↔secondary transitions). This can happen when a primary server has failed and a new server is elected as the primary server, or a load on a server exceeds a specified threshold and the primary role is being load balanced out of the server. The shard manager client component 405 can feed in the relevant configuration change into the data shuttle component 410 in order for the data shuttle component 410 to update the state of the first server 450 appropriately.

In some embodiments, to help the shard management server 440 to make optimal decisions surrounding an election of the primary server, the data shuttle components of the servers, e.g., the data shuttle component 410, can publish a fingerprint of the state associated with every shard. The shard management server 440 can use this information to select the best possible candidate from the replica set. The shard management server 440 can load balance shard roles across servers, and also load balance shards themselves across servers. The ability to load balance shards themselves across servers can help in scaling of the servers in a particular tier since adding servers to a hot tier can automatically trigger existing shards in the system 400 to be evenly placed across the servers.

In some embodiments, each of the servers in the distributed computing system 150 includes the components described in association with the first server 450, e.g., components 405-420 and 445.

Figure 5:
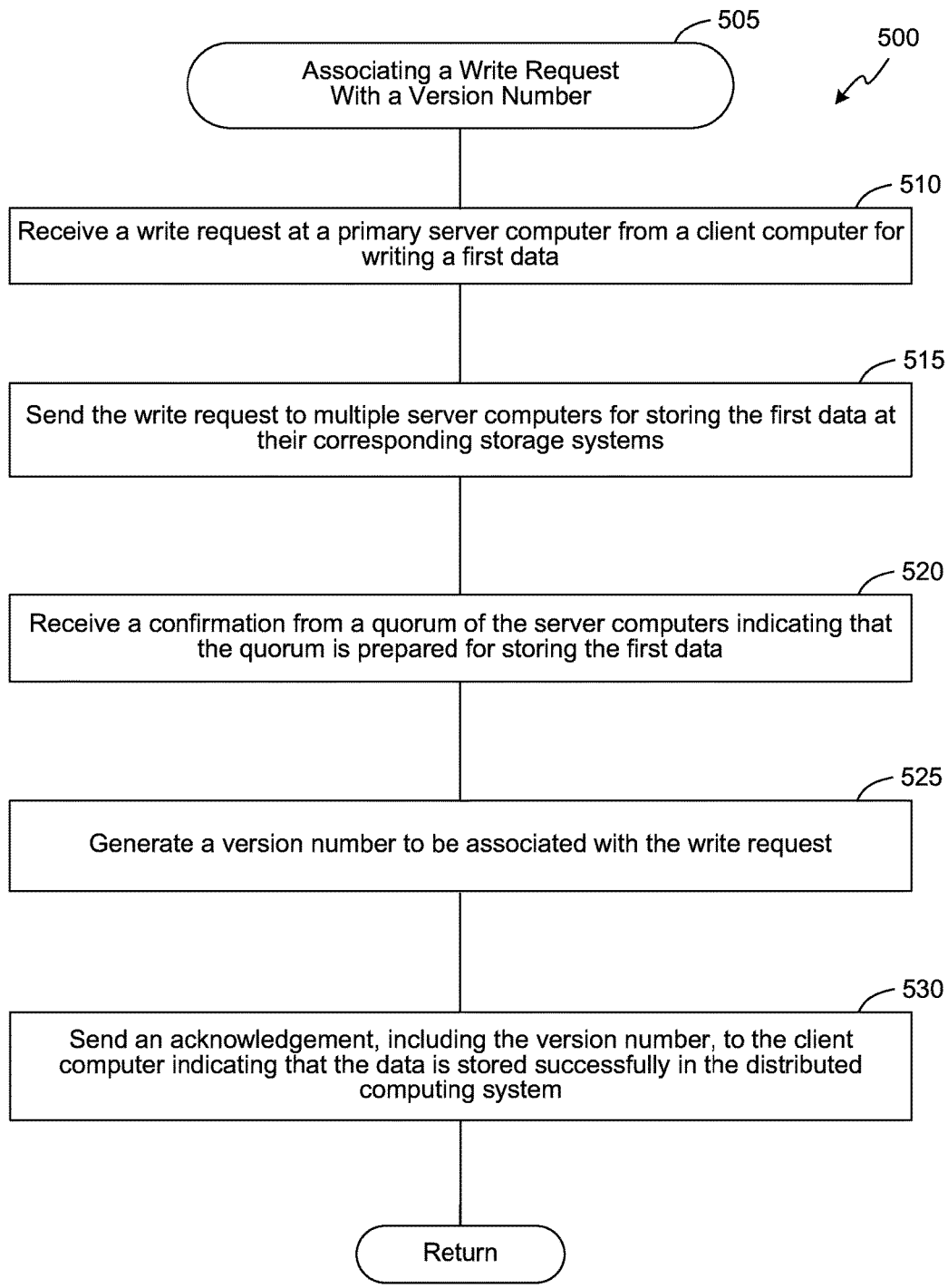
FIG. 5 is a flow diagram of a process of associating a write request with a version number in a distributing computing system of FIG. 1, consistent with various embodiments.

FIG. 5 is a flow diagram of a process 500 of associating a write request with a version number in a distributing computing system of FIG. 1, consistent with various embodiments. The process 500 may be executed in the environment 100 of FIG. 1 and using the system 400 of FIG. 4. The process 500 begins at block 505, and at block 510, the request handler component 415 of a primary server, e.g., primary server 115, receives a first write request at the primary server 115 from a client, e.g., client 125, for writing a first data, e.g., first data 155.

The primary server 115 may have to replicate the data to the servers in a sync replica set associated with a shard to which the first data 155 belongs. At block 515, the data shuttle component 410 sends a request to the servers in the sync replica set for storing the first data 155. For example, the primary server 115 sends the request to a number of secondary servers including the secondary servers 120a and 120b. In some embodiments, the primary server 115 also sends the first data 155 to the secondary servers 120a and 120b as part of the request.

At block 520, the data shuttle component 410 receives a confirmation from a quorum of the servers confirming their preparedness to store the first data 155. In some embodiments, the secondary servers 120*a* and 120*b* form the quorum of the servers.

At block 525, the version management component 445 generates a version number, e.g., version number 110, for the first write request. A version number uniquely identifies a specified write request from a specified client. In some embodiments, the version number is a monotonically increasing number which is incremented for every write request received from the specified client. The version management component 445 associates the version number 110 with the first write request.

At block 530, the request handler component 415 sends the version number 110 to the client 125. In some embodiments, the request handler component 415 sends the version number associated with the first write request to the client 125 along with the acknowledgement of the first write request. The client 125 can store the version number 110 in association with the first data 155. This version number 110 can be used by the client 125, e.g., in a subsequent read request for obtaining the first data 155. By using this version number 110 in the read requests, the client 125 can be assured of the read-after-write consistency for the first data 155.

After the request handler component 415 sends the acknowledgement to the client 125, the primary server 115 issues a commit instruction to the secondary servers 120*a* and 120*b* and to each of the other servers in the sync replica set that are configured to store a copy of the first data 155, for storing the first data 155 in their corresponding storage systems. The primary server 115 too can store the first data 155 in the storage system 135.

Figure 6:
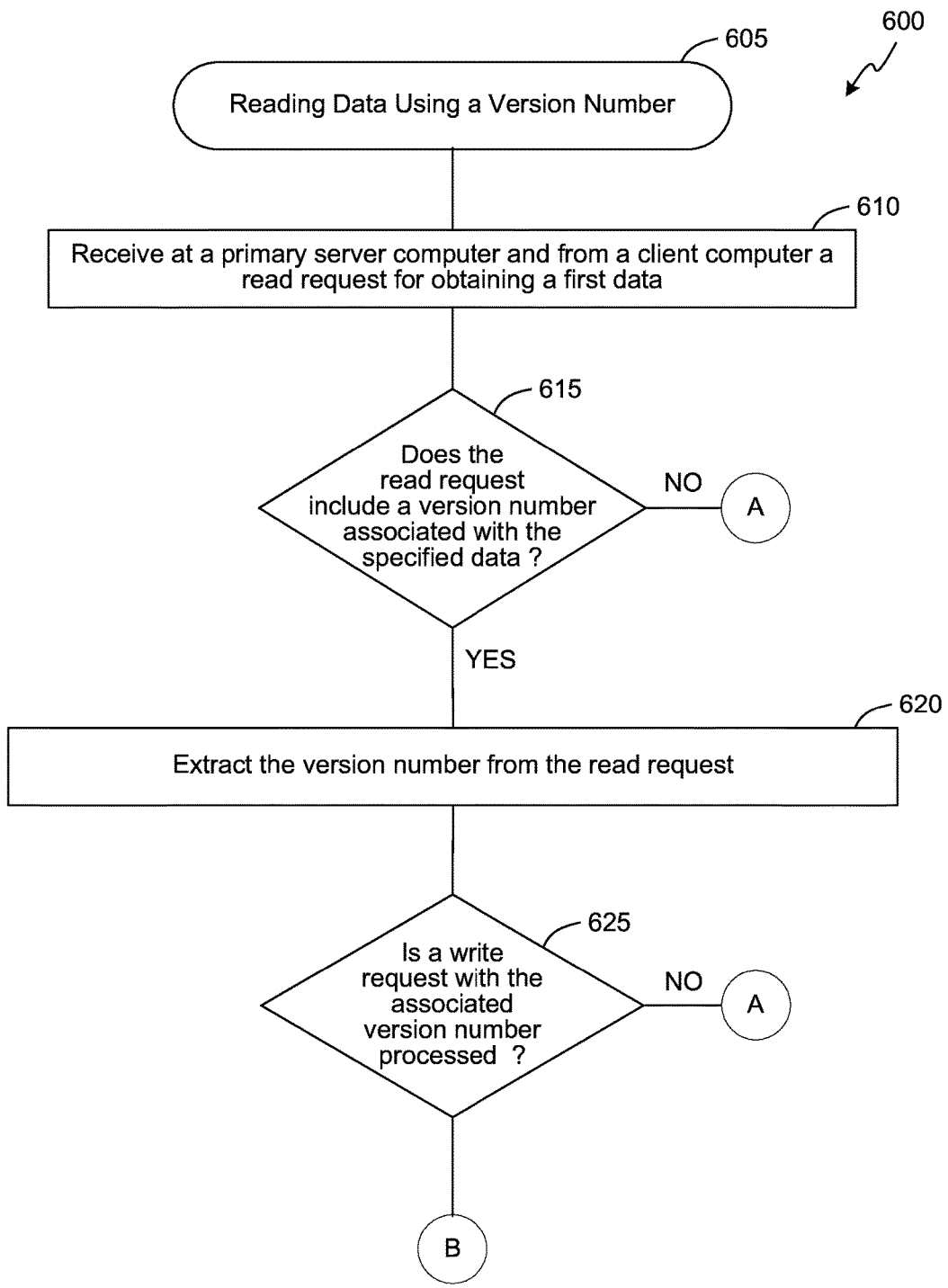
FIG. 6 is a flow diagram of a process of processing a read request using a version number to ensure read-after-write consistency in the distributing computing system of FIG. 1, consistent with various embodiments.
Figure 6:
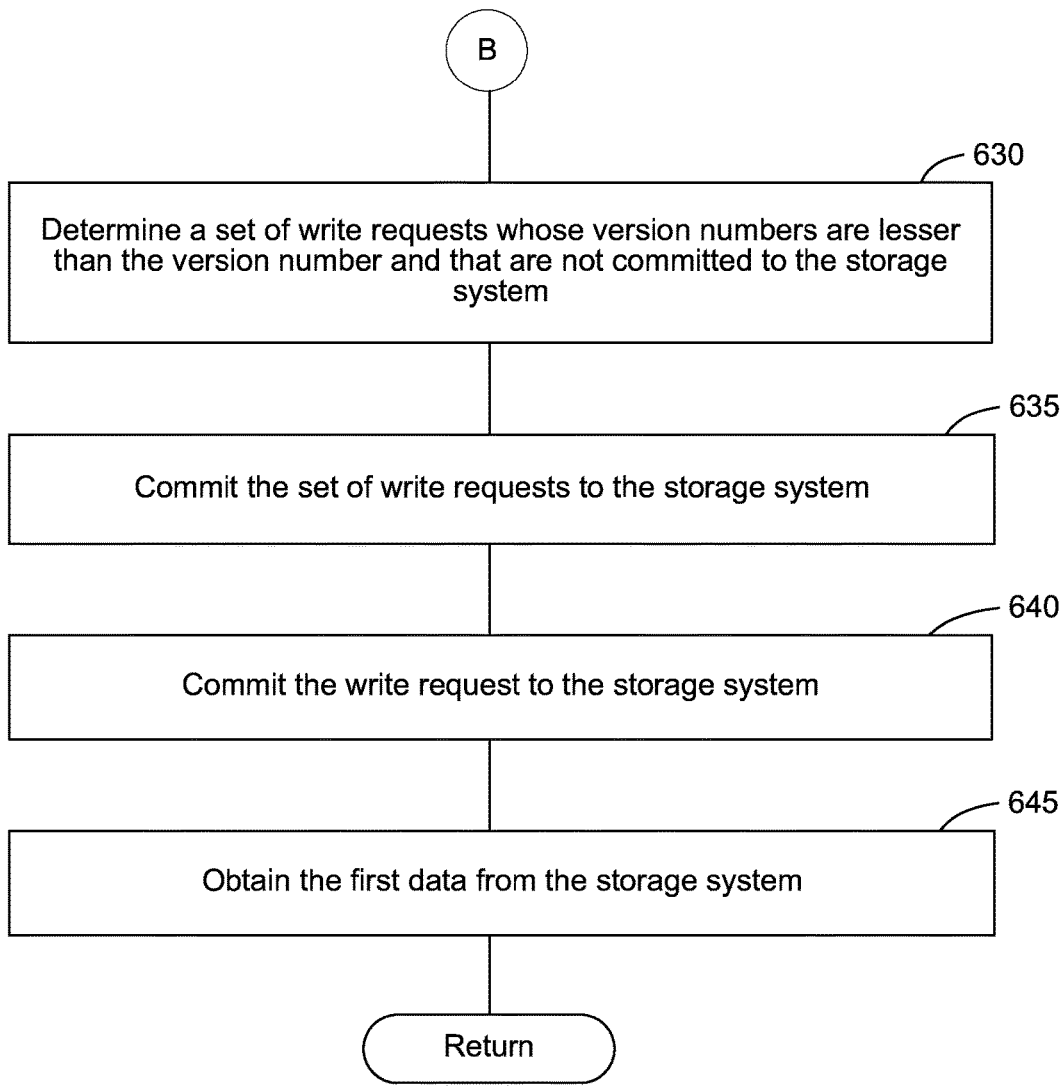

FIG. 6 is a flow diagram of a process 600 of processing a read request using a version number to ensure read-after-write consistency in the distributing computing system of FIG. 1, consistent with various embodiments. The process 600 may be executed in the environment 100 of FIG. 1 and using the system 400 of FIG. 4. The process 600 begins at block 605, and at block 610, the request handler component 415 of a primary server, e.g., the primary server 115, receives a read request for a specified data from a client, e.g., the client 125.

At determination block 615, the request handler component 415 determines if the read request includes a version number, e.g., in a header of the read request. In some embodiments, the client 125 can include the version number associated with the specified data if the client 125 intends to obtain a read-after-write consistency for the specified data.

If the request header does not include the version number, the process 600 proceeds to block 645 where the request handler component 415 obtains the specified data from the storage system 135 associated with the primary server 115. On the other hand, if the request header includes the version number, at block 620, the request handler component 415 extracts the version number from the read request.

At determination block 625, the request handler component 415 determines if the write request associated with the version number is processed. In some embodiments, the primary server 115 inserts the write request into a queue of write requests, e.g., queue 205. The queue 205 can include a number of write requests that are yet to be processed by the primary server 115. The write requests in the queue 205 can be ordered in the order they were received at the primary server 115. Further, the write requests in the queue 205 also include the version numbers they are associated with. The primary server 115 processes the write requests based on the order they were received, e.g., in the increasing order of their version numbers. The data associated with a specified write request in the queue 205 is stored at the storage system 135 as and when the specified write request is processed by the primary server 115.

If the request handler component 415 determines that the write requested associated with the version number extracted from the read request is already processed, the process 600 proceeds to block 645 where the request handler component 415 obtains the specified data from the storage system 135 associated with the primary server 115.

On the other hand, if the request handler component 415 determines the write requested associated with the version number extracted is still in the queue 205, at block 630, the request handler component 415 (or the data shuttle component 410) determines a set of write requests in the queue 205 that have version number lesser than that of the write requested associated with the extracted version number.

At block 635, the request handler component 415 (or the data shuttle component 410) processes those set of write requests, e.g., stores the data associated with the set of write requests at the storage system 135.

At block 640, after the set of write requests are processed, the request handler component 415 (or the data shuttle component 410) processes the write request associated with the extracted version number, e.g., stores the specified data in the storage system 135.

At block 645, the request handler component 415 obtains the specified data from the storage system 135 and returns the specified data to the client 125. This way, the client 125 can be assured of the read-after-write consistency.

Figure 7:
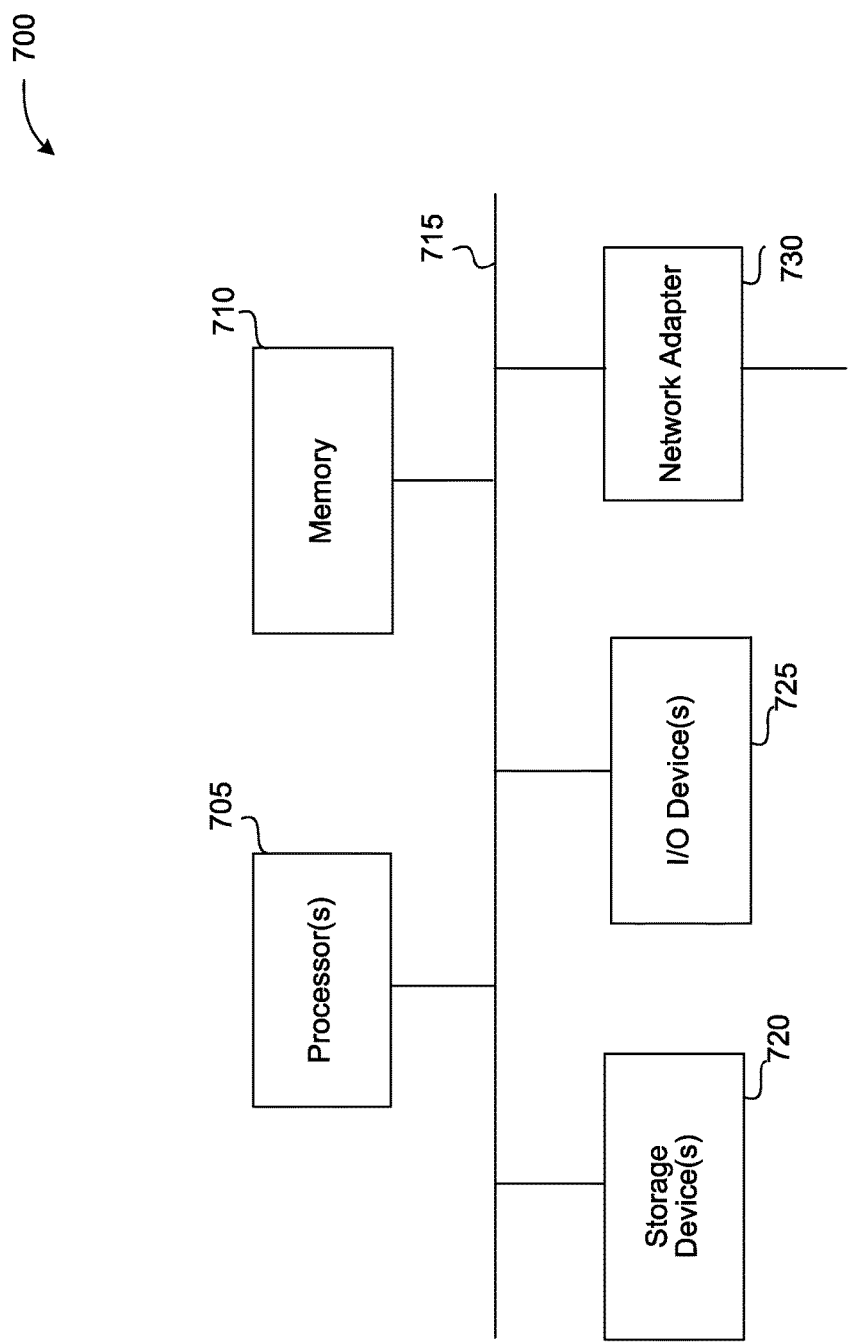
FIG. 7 is a block diagram of a processing system that can implement operations of the present invention.

FIG. 7 is a block diagram of a computer system as may be used to implement features of the disclosed embodiments. The computing system 700 may be used to implement any of the entities, components or services depicted in the examples of the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a primary server computer, comprising:
   receiving, from a client computer, in a distributed computing system having multiple server computers, a write request for writing a first data;
   generating a version number to be associated with the write request, the version number being unique to the write request and the client computer from which the write request is received;
   sending the write request to a quorum of the server computers for storing the first data at their corresponding storage systems;
   receiving an indication that the quorum of the server computers is prepared for storing the first data;
   sending, in response to receiving the indication, an acknowledgement for the write request to the client computer, the acknowledgement including the version number;
   receiving a read request from the client computer for obtaining the first data, the read request including the version number; and
   performing, in response to a determination that the write request associated with the version number has not already been committed to a storage system associated with the primary server computer:
      committing a set of write requests that precede the write request within a write queue to the storage system;
      subsequently committing the first data of the write request identified by the version number to the storage system; and
      returning the first data from the storage system to the client computer to satisfy the read request such that a client of the client computer is assured of read-after-write consistency.

2. The method of claim 1, further comprising updating a last written request version number with the version number of the write request.

3. The method of claim 2, wherein writing the first data to the storage system includes adding the write request to the write queue at the primary server computer, the write queue including the set of write requests that is yet to be committed to the storage system and in the order of version numbers of the set of write requests.

4. The method of claim 1 further comprising:
   writing, by the quorum of the server computers, the first data to their corresponding storage systems.

5. The method of claim 1, further comprising confirming that the write request associated with the version number has been committed to the storage system associated with the primary server computer.

6. The method of claim 1, wherein the primary server computer generates the version number as part of a sequence of version numbers that is unique to the client of the client computer.

7. The method of claim 1, receiving, at one of the quorum of the server computers, a read request from the client computer for obtaining the first data.

8. The method of claim 7, further comprising:
executing the read request at each of the quorum of the server computers to determine a server computer of the server computers that is storing a specified data received as part of a specified write request associated with the version number;
obtaining the specified data from the server computer; and
sending the specified data as the first data to the client computer.

9. The method of claim 1, wherein the version number is incremented monotonically for every write request received from the client computer to generate a sequence of version numbers.

10. The method of claim 9, wherein the sequence of version numbers is unique to the client computer.

11. The method of claim 9, wherein generating the version number further includes:
generating, by the primary server computer, a first sequence of version numbers for a first set of write requests received from a first client computer; and
generating, by the primary server computer, a second sequence of version numbers for a second set of write requests received from a second client computer.

12. The method of claim 1, wherein the quorum of the server computers and the primary server computer together form a replica set for the first data, the replica set configured to store multiple replicas of the first data.

13. The method of claim 1, wherein the distributed computing system stores a set of data as multiple shards, at least some of the shards including distinct subsets of the set of data, at least some of the shards assigned distinct replica sets.

14. The method claim 13, wherein receiving the write request for the first data at the primary server computer includes determining a replica set of the replica sets assigned to a shard of the shards to which the first data belongs.

15. The method of claim 14, wherein the replica set includes a set of the server computers in which:
one of the server computers is designated as the primary server computer for the shard, the primary server computer configured to process a read and/or write request associated with data stored in the shard; and
one or more of the server computers is designated as secondary server computers for the shard, the secondary server computers restricted to processing a read request associated with the data stored in the shard.

16. The method of claim 1, wherein sending the first data to the quorum of the server computers includes:
sending, by the primary server computer, the first data to the quorum of the server computers synchronously.

17. A non-transitory computer-readable storage medium storing computer-readable instructions that, when executed by a processor of a primary server computer, cause the primary server computer to:
receive, from a client computer, in a distributed computing system having multiple server computers, a write request for writing a first data;
generate a version number to be associated with the write request, the version number being unique to the write request and the client computer from which the write request is received;
send the write request to a quorum of the server computers for storing the first data at their corresponding storage systems;
receive an indication that the quorum of the server computers is prepared for storing the first data;
send, in response to receiving the indication, an acknowledgement for the write request to the client computer, the acknowledgement including the version number;
receive a read request from the client computer for obtaining the first data, the read request including the version number; and
perform, in response to a determination that the write request associated with the version number has not already been committed to a storage system associated with the primary server computer:
committing a set of write requests that precede the write request within a write queue to the storage system;
subsequently committing the first data of the write request identified by the version number to the storage system; and
returning the first data from the storage system to the client computer to satisfy the read request such that a client of the client computer is assured of read-after-write consistency.

18. The non-transitory computer-readable storage medium of claim 17, wherein the computer-readable instructions further cause the primary server computer to update a last written request version number with the version number of the write request.

19. A system, comprising:
a processor;
a physical memory storing components comprising:
a request handler component configured to receive, from a client computer, at a primary server computer in a distributed computing system having multiple server computers, a write request for storing a first data at one or more of the server computers;
a version management component configured to generate a version number to be associated with the write request, the version number being unique to the write request and the client computer; and
a data shuttle component configured to receive an indication from a quorum of the server computers that the quorum of the server computers is prepared for storing the first data at their corresponding storage systems,
wherein the request handler component is further configured to:
send, in response to receiving the indication, an acknowledgement for the write request to the client computer, the acknowledgment including the version number;
receive a read request from the client computer for obtaining the first data, the read request including the version number; and
perform, in response to a determination that the write request associated with the version number has not already been committed to a storage system associated with the primary server computer:
committing a set of write requests that precede the write request within a write queue to the storage system;

subsequently committing the first data of the write request identified by the version number to the storage system; and returning the first data from the storage system to the client computer to satisfy the read request such that a client of the client computer is assured of read-after-write consistency.

20. The system of claim 19, wherein the primary server computer is further configured to update a last written request version number with the version number of the write request.

* * * * *